UNITED STATES PATENT OFFICE.

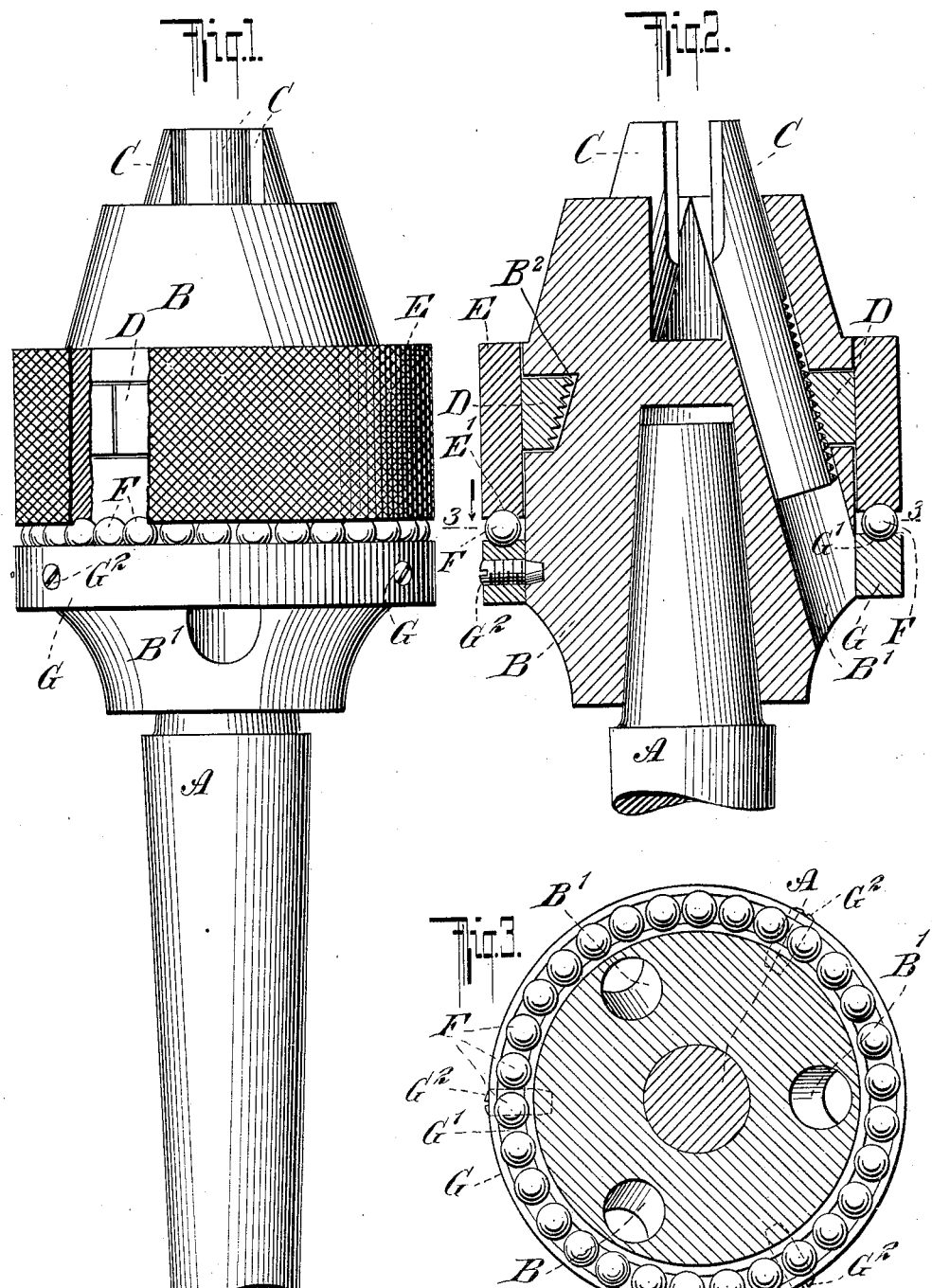

THOMAS R. ALMOND, OF YONKERS, NEW YORK, ASSIGNOR TO T. R. ALMOND MANUFACTURING COMPANY, OF BROOKLYN, NEW YORK, A CORPORATION OF NEW YORK.

DRILL-CHUCK.

No. 897,335.　　　　Specification of Letters Patent.　　Patented Sept. 1, 1908.

Application filed December 29, 1904. Serial No. 238,724.

*To all whom it may concern:*

Be it known that I, THOMAS R. ALMOND, a citizen of the United States, residing at Dunwoodie, Yonkers, Westchester county, State of New York, have invented certain new and useful Improvements in Drill-Chucks, of which the following is a specification.

My invention relates to chucks for holding drills or other tools and has for its object to provide a drill-chuck of that character in which the tool-holding jaws are tightened or loosened by the movement of a nut, and it has been my particular aim to provide for an easy adjustment of the jaws with the aid of ball-bearings constructed as will be described in detail hereinafter.

The novel features of my invention will be pointed out in the appended claims.

Reference is to be had to the accompanying drawings, in which

Figure 1 is an elevation partly broken away of my improved drill-chuck, Fig. 2 is a sectional elevation thereof and Fig. 3 is a horizontal section on line 3—3 of Fig. 2.

A indicates the customary shank which is adapted to fit into the recess at one end of the chuck body B. The other end of the chuck body is also provided with a recess in which move the forward ends of the jaws C, received in forwardly converging recesses B'. At their diverging rear portions the jaws C are provided with screw-threads and adapted to fit into those of the nut D, tapered internally and fitted into an annular recess B² of the chuck body B. In order that the nut may be placed in this recess it is made of at least two ring segments. These segments of the nut are normally held together by a sleeve or ferrule E, which is slipped on endwise and is held to the nut in any suitable manner, as by slightly tapering the inner surface of the ferrule, or by driving a pin through the ferrule into the nut. At its rear edge the ferrule is made with a concave groove E' adapted to form a run-way for ball-bearings F, which also rest in a similar groove G' provided on a ring G attached to the body A by pins G² or otherwise; or if desired, the ring G may be formed integral with the body A. The nut and ferrule thus have a very easy motion, and the manipulation of the chuck for the adjustment of the jaws is greatly facilitated. As the balls F fit the grooves E' and G' on the outer side of the body, they produce the requisite anti-friction bearing without employing an outer retaining ring and are always accessible to cleaning and lubrication. They serve to avoid friction in the adjustment of the jaws, which is produced by turning the ferrule and nut.

What I claim is:

In a chuck, the combination of the body having a tapering front end, longitudinal recesses converging toward said end, and an annular recess communicating with said longitudinal recesses, a ring surrounding the body in the rear of said annular recess, and rigidly secured to the body, a rotatable ferrule surrounding the body loosely in advance of said ring and in line therewith, said ferrule inclosing the annular recess of the body, a sectional nut located in said annular recess and arranged to rotate in unison with the ferrule, bearing balls interposed between the adjacent ends of the ring and ferrule, and converging jaws mounted to slide in the longitudinal recesses of the body and screw-threaded to fit the said nut.

In testimony whereof I have hereunto set my hand in the presence of two subscribing witnesses.

THOMAS R. ALMOND.

Witnesses:
　JOHN LOTKA,
　EUGENE EBLE.